(12) United States Patent
Motley

(10) Patent No.: US 6,283,156 B1
(45) Date of Patent: Sep. 4, 2001

(54) EXPANDABLE O-RING SEAL, METHOD OF SEALING AND APPARATUS HAVING SUCH SEALS

(75) Inventor: Jerry D. Motley, Glen Rose, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/098,906

(22) Filed: Jun. 17, 1998

(51) Int. Cl.[7] .................................................. F16L 55/12
(52) U.S. Cl. .................................. 138/89; 138/90; 138/93
(58) Field of Search ................................ 138/90, 93, 89

(56) References Cited

U.S. PATENT DOCUMENTS

| | | | |
|---|---|---|---|
| 4,342,336 | * | 8/1982 | Satterthwaite et al. ............ 138/93 X |
| 4,506,706 | * | 3/1985 | Sandmann .............................. 138/93 |
| 4,614,206 | * | 9/1986 | Mathison et al. .................. 138/90 X |
| 5,119,861 | * | 6/1992 | Pino .................................... 138/93 X |
| 5,209,266 | * | 5/1993 | Hiemsoth ................................ 138/90 |
| 5,353,842 | * | 10/1994 | Lundman ............................... 138/93 |
| 5,402,828 | * | 4/1995 | Pino ...................................... 138/93 |

* cited by examiner

*Primary Examiner*—Patrick Brinson
(74) *Attorney, Agent, or Firm*—J. M. (Mark) Gilbreth; Gilbreth & Associates, P.C.; Mary A. Gilbreth

(57) ABSTRACT

The present invention discloses a pressured O-ring type sealing system which allows for effective seals without expensive and time consuming machining of the sealing surface. The O-ring sealing system of the present invention allows the sealing member to conform to the natural surface irregularities of the sealing surface and to compensate for any eccentricities between the plug and the inner diameter of the member being sealed.

11 Claims, 3 Drawing Sheets

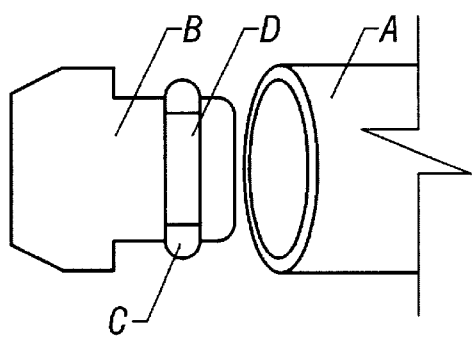
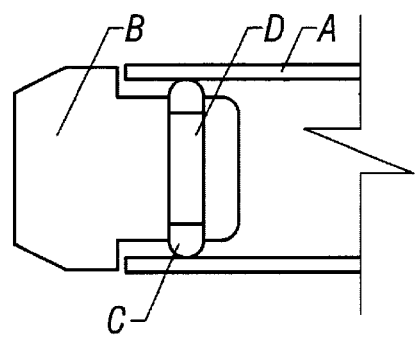
FIG. 1A
*(Prior Art)*
FIG. 1B
*(Prior Art)*
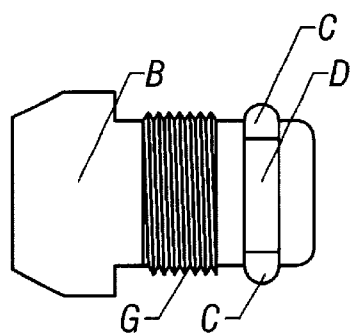
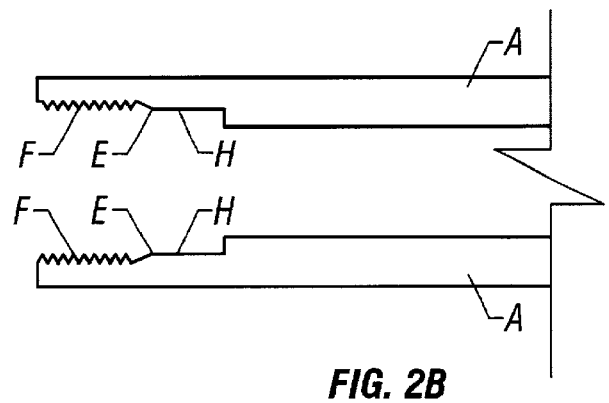
FIG. 2A
*(Prior Art)*
FIG. 2B
*(Prior Art)*
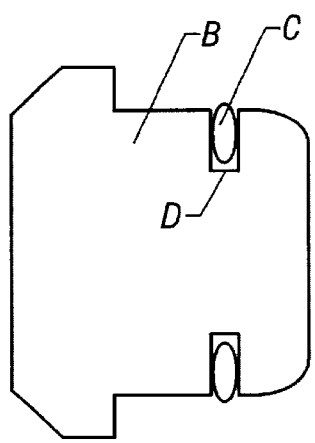
FIG. 3
*(Prior Art)*

EXPANDABLE O-RING SEAL, METHOD OF SEALING AND APPARATUS HAVING SUCH SEALS

BACKGROUND OF THE INVENTION

1. Field of the Invention

The present invention relates to seals, to methods of sealing, and to apparatus having such seals. In another aspect, the present invention relates to O-ring seals, to methods of sealing, and to apparatus having such seals. In even another aspect, the present invention relates to pressurized O-ring seals, to methods of sealing, and to apparatus having such seals. In still another aspect, the present invention relates to pressurized expandable O-ring seals, to methods of sealing, and to apparatus having such seals.

2. Description of the Related Art

O-ring type seals are commonly used to form an effective seal between two mating parts. An example of an O-ring type seal includes a plug having a gland groove in which a O-type seal is placed. In order for such a plug to seal a tubular member, the O-ring must have a diameter larger than the both the inner diameter of tubular member and the outer diameter of the plug. When the plug is inserted into the tubular member, the O-ring is squeezed between the two thereby forming a seal. Typically, for such a seal to be effective, the inner diameter of the tubular member must be machined smoothed at the point of sealing.

In another example, a plug can include screw threads. The tubular member would include complimentary threads and would also normally include lead-in angles to allow an O-ring to be squeezed down when entering the sealing area of the tubular member as the plug is screwed in. To form an effective seal, the tubular member will again require machining to remove any scale or other surface roughness at the sealing area, and provide an even surface for the O-ring to seat against. A disadvantage of this type of O-ring seal is that the threaded area on the tubular member must be under-cut to avoid damage to the O-ring by the threads on the tubular member as the plug is being inserted.

In order to make an effective seal, it is therefore common practice in the prior art to have the O-ring gland groove slightly larger than the inner diameter of the O-ring and wider than the cross section of the O-ring. This design gives the squeeze to the O-ring and allows axial movement of the O-ring as it is inserted into the sealing area. A typical O-ring has a 'squeeze' or reduction in its original cross section of about 10% to about 15% to form a seal.

Therefore, there is a need in the art for an O-ring seal that does not suffer from the disadvantages of the prior art, to a method of making such a seal, and to apparatus including such a seal.

Therefore, there is a need in the art for an O-ring seal that conforms to any sealing surface, to a method of making such a seal, and to apparatus including such a seal.

There is even another need in the art for an effective O-ring seal that does require expensive time consuming machining of and/or undercuts to the sealing surface, to a method of making such a seal, and to apparatus including such a seal.

These and other needs in the art will become apparent to those of skill in the art upon review of this specification, including its drawings and claims.

SUMMARY OF THE INVENTION

It is an object of the present invention to provide for an O-ring seal that does not suffer from the disadvantages of the prior art.

It is another object of the present invention to provide for an effective O-ring seal that conforms to any sealing surface.

It is even another object of the present invention to provide for an effective O-ring seal that does require expensive time consuming machining of and/or undercuts to the sealing surface.

These and other objects of the present invention will become apparent to those of skill in the art upon review of this specification, including its drawings and claims.

According to one embodiment of the present invention, there is provided a sealing apparatus, which first includes a plug having a groove. Positioned in the groove is seal, generally an O-ring type seal, defining a liquid reservoir within the groove. A passage with a valve is provided to the liquid reservoir, for providing pressure to a liquid within the reservoir.

According to another embodiment of the present invention, there is provided a sealing apparatus, which in addition to the above, further includes a mating member defining an orifice for receiving the plug such that the seal abuts against a wall of the orifice.

According to even another embodiment of the present invention, there is provided a sealing apparatus, which in addition to the above, further includes threads on the plug, and a threaded mating member defining an orifice for receiving the plug, such that the plug abuts against a wall of the orifice, with the threads of the plug engaged with the threads of the mating member.

According to still another embodiment of the present invention, there is provided a method of sealing an orifice, with the method including placement of a plug as described above in the orifice, such that the seal is positioned to seal the orifice. The method further includes application of pressure to the fluid to expand the seal, thereby forming a pressurized seal.

These and other embodiments of the present invention will become apparent to those of skill in the art upon review of this specification, including its drawings and claims.

BRIEF DESCRIPTION OF THE DRAWINGS

FIGS. 1A and 1B are cross sectional views of one prior art O-ring seal showing a tubular member A, and a plug B having groove D in which O-ring C is placed, showing respectively, plug B in an unsealed and sealed position.

FIGS. 2A and 2B are cross-sectional views of another prior art O-ring seal showing plug B having screw threads G and tubular member A having receiving threads F.

FIG. 3, is a cross-sectional view of a prior art O-ring illustrating gland groove D as being slightly larger than the inner diameter of O-ring C and wider than the cross section of the O-ring.

DETAILED DESCRIPTION OF THE INVENTION

Before discussing the present invention, reference will first be made to the prior art, namely FIGS. 1A, 1B, 2A, 2B and 3.

FIGS. 1A and 1B are a cross sectional view of one illustration of a prior art O-ring type seal showing a tubular member A being sealed with a plug B having gland groove D in which O-ring C is placed. In order for plug B to seal tubular member B, O-ring C must have a diameter larger than the both the inner diameter of tubular C and the outer diameter of plug B such that when plug B is inserted into tubular member A, O-ring C is squeezed between the two thereby forming a seal which will require the inner diameter of tubular member A to be machined smoothed.

FIGS. 2A and 2B are a cross-sectional view of another illustration of a prior art O-ring seal. In this prior art example, plug B includes screw threads G and tubular member A includes receiving threads F. As shown in FIG. 2B of the prior art seal, tubular member A normally includes lead-in angles E to allow O-ring C to be squeezed down when entering the sealing area H as plug B is screwed into tubular member A. For an effective seal, tubular member A in FIG. 2B will require machining to remove any scale or other surface roughness at sealing area H to provide an even surface for O-ring C. Another disadvantage of the prior art O-ring seal of FIGS. 2A is that the threaded area on tubular member A must under-cut to avoid damage to O-ring C by threads F as plug B is inserted into tubular member A.

In order to make an effective seal, it is therefore common practice in the prior art, as illustrated in FIG. 3, to have the O-ring gland groove D slightly larger than the inner diameter of O-ring C and wider than the cross section of the O-ring. This gives the squeeze to the O-ring and allows axial movement of the O-ring as it is inserted into the sealing area. For an effective seal of the type shown the prior art O-ring C must typically have a 'squeeze' or reduction in its original cross section of about 10% to about 15%.

Figure 4A:
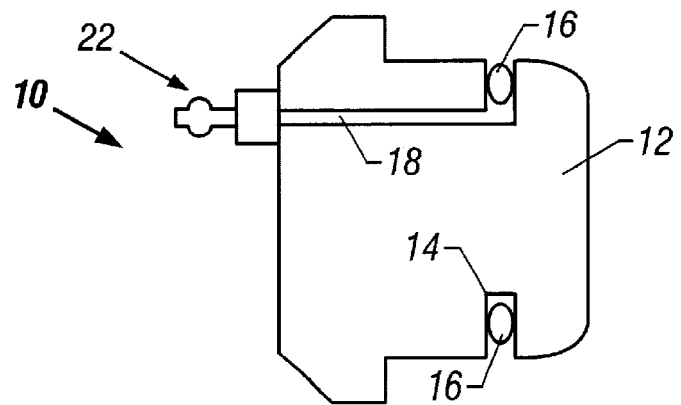
FIG. 4A, is a cross-sectional view of sealing system 10 of the present invention shown generally to include plug member 12, groove 14 suitable for receiving sealing member 16, and check valve 22 connected to channel 18.

Referring now to FIGS. 4A–7, there is shown one embodiment of the sealing system 10 of the present invention. Referring to FIG. 4A, sealing system 10 is shown generally to include plug member 12 having groove 14 suitable for receiving sealing member 16. Plug member 12 includes check valve 22 connected to channel 18 which is in fluid communication with groove 14. Referring to FIG. 4B, sealing system 10 is designed to be inserted directly into and form a seal with outer member 24.

Figure 4B:
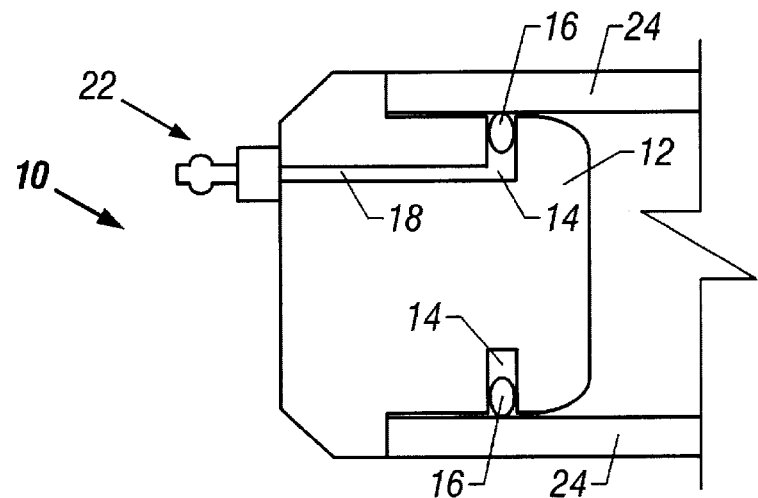
FIG. 4B, is a cross-sectional view of sealing system 10 of the present invention inserted into outer member 24.
Figure 5:
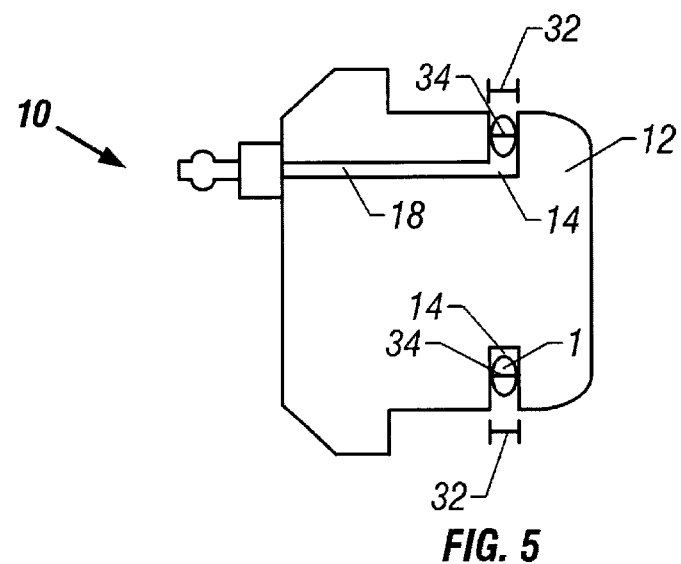
FIG. 5 is an illustration showing that the width of groove 14 of sealing system 10 is smaller than the outer diameter 34 of the cross-section of sealing member 16.

Referring still to FIGS. 4A and 4B, plug member 12 may be of any shape suitable to insert into outer member 24. Preferably, outer member 24 is a tubular member having an inner diameter with plug member 12 having a slightly smaller outer diameter such that plug member 12 may be inserted into and removed from tubular member 24.

Plug member 12 may be made of any suitable material. Non-limiting examples of suitable materials include plastic, metal, metal alloy or steel. Preferably, plug member 12 is steel.

Groove 14 is a continuous groove surrounding plug 16. Groove 14 may be of any suitable shape to receive sealing member 16. Generally, the width of groove 14 must be less than the outer diameter 34. Preferably, referring now to FIG. 5, the width of grove 14 must be in the range of about 5% to about 30% less than cross-section 34 of sealing member 16. More preferably, the width of groove 14 must be in the range of about 10% to about 20% less than the cross section 34 of sealing member 16.

Figure 6:
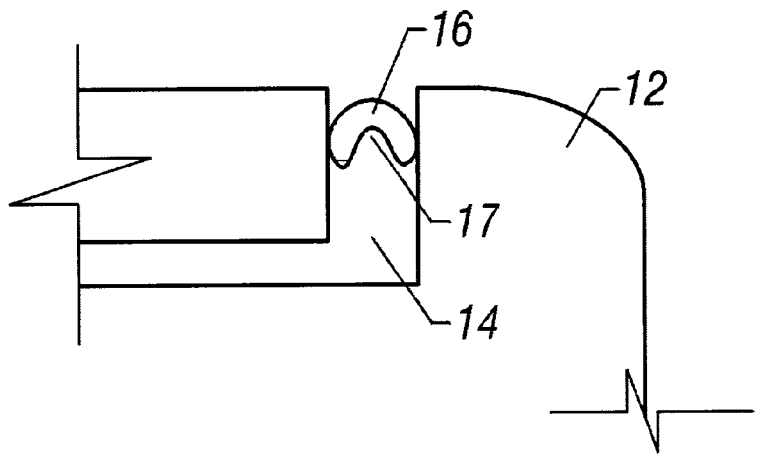
FIG. 6 is an illustration showing the cross-sectional area of sealing member 16 could optionally contain an open area 17.

While sealing member 16 is shown in the figures to have a roughly circular cross-sectional area, it is understood that sealing member 16 may have any suitable cross-sectional shape to form a seal between the outer diameter of the plug and the inner diameter of the tubular member. Non-limiting examples of suitable cross-section shapes of sealing member 16 include circular, semi-circular or oblong. Optionally, as shown in FIG. 6, the cross-sectional area of sealing member 16 could contain an open area 17.

The sealing member 16 may be made of any material suitable to form a seal between the outer diameter of the plug an the inner diameter of the tubular member. Preferably, for high temperature and chemical resistance, sealing member 16 is made of a cross-linked or vulcanized elastomer such as disclosed in U.S. Pat. No. 5,254,616 incorporated herein by reference. Examples of suitable elastomers include nitrile butadiene rubber, nitrile silicon rubber, neoprene, vinyldine fluoride, and urethane. More preferably, sealing member 16 is made of nitrile butadiene rubber, a commercially available example of which is BUNA N available from Moss Seal Company or Apple Rubber Products, Inc.

Channel 18 cuts through plug 12 and connects check valve 22 to groove 14. Channel 18 may be of any suitable size and shape to provide a path for fluid 26 introduced through valve 22 to flow into groove 14 and put pressure on sealing member 16.

Check valve 22 may be any device, as is known in the art, to allow fluid to be introduced into channel 18 to apply and hold pressure on sealing member 16 such that sealing member 16 forms a seal against outer member 24. Preferably, check valve 22 is a leak proof grease fitting.

Figure 7:
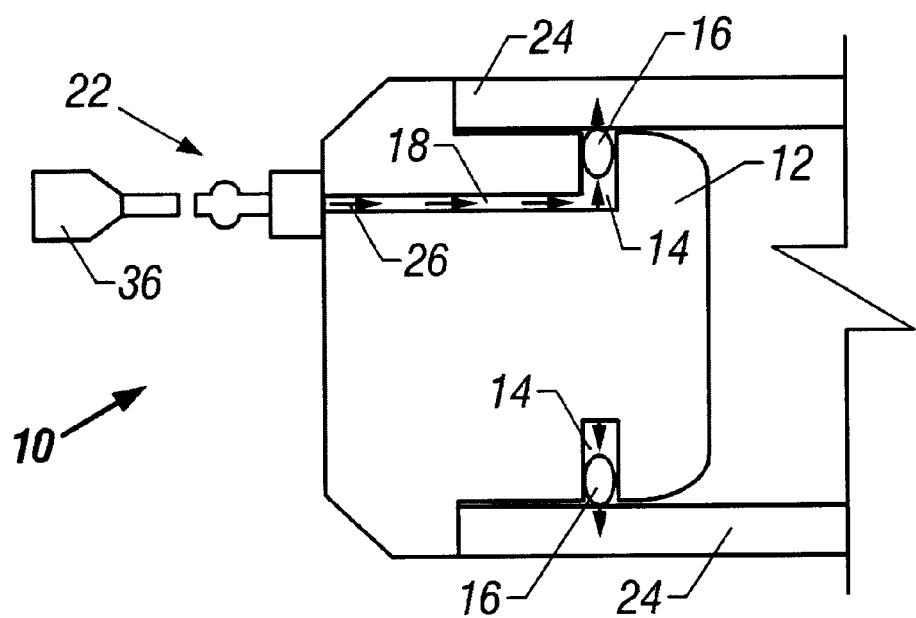
FIG. 7, is an illustration of the operation of sealing system 10 of the present invention showing fluid 26 being forced through channel 18 and into groove 14 causing sealing member 16 to seal against outer member 24.

Referring now to FIG. 7, in operation plug 12 is inserted into outer member 24. A grease gun 36 or other delivery means for fluid 26 is attached to check valve 22. Fluid 26 is forced through channel 18 and into groove 14. Fluid 26 applies pressure to sealing member 16 thereby forcing it up against the inner diameter of outer member 24 creating a seal.

Fluid 26 may be any suitable fluid to provide enough pressure to expand sealing member 16 against outer member 24. Non-limiting examples of suitable fluids include hydraulic fluid, paraffinic and cycloparaffinic petroleum fractions, greases, oils, glycols, hydrocarbons or combinations thereof, as well as air or other gases. Preferable, fluid 26 is a liquid hydrocarbon of suitable viscosity such that when depressurized, plug 12 may be easily removed from outer member 24. More preferably, fluid 26 may be a commercially available oil treatment products such as is sold under the tradename STP.

EXAMPLES

The following examples are provided merely to illustrate the present invention, and are not intended to limit the scope of the claims.

Example 1

PURPOSE: The purpose of this example is to test the sealing ability of the expandable O-ring system on the Slickwall gun system.

TEST SETUP: A 1 foot section of gun tube was cut from the parent joint of 4" line pipe. Four each 0.75" diameter holes at 90° to each other were machined in the ends of the tube section. The subs were designed to easily slide into the tube section with the O-ring OD the same size of the sub's OD, thus allowing the O-ring to pass the 4 machined holes without being cut. No surface preparation was done to the ID of the tube section. The O-ring groove was connected to a thru hole to an external grease fitting. This allowed for pressurizing up on the O-ring groove to expand the O-ring making the O-ring conform to the ID of the tube section. With both subs inserted into the tube section and the O-rings expanded, the assembly was placed into a Navy gun and pressurized to 4000 psi and held for 5 minutes.

RESULTS The pressure chamber was depressurized and the gun section removed. The grease fitting was removed to depressurize the O-ring groove thus allowing the O-ring to contract and a sub to be removed.

Removal revealed that approximately 80–90 ml of fluid had seeped into the tube section. The seepage may have occurred because the grease fittings were not holding the pressure well and leaking slowly. This may have allowed some of the squeeze to be released before the chamber could be pressurized and hold the pre-loaded seating of the O-ring.

SUMMARY The amount of fluid leaking into the gun section represented only approximately 1". Notably, no surface preparation was done to the ID of the gun section to determine if the seal would hold in a worst case situation.

Example 2

PURPOSE: The test was conducted with leak proof grease fittings to determine the cause of seepage in example 1.

TEST SETUP: The same equipment was used as in example 1 except that the grease fitting were the leak proof design and the inside of the gun was wire brushed smooth up the section where the O-ring seats. The system was assembled and the O-rings were pressured up with a hand grease gun. Notably, the grease fittings held pressure and no fluid leakage was observed. The system was placed in a navy gun chamber and pressurized to 5000 psi and held for 20 minutes. The chamber was then depressurized and the gun system removed and disassembled.

RESULTS: Upon removal of one of the subs it was noted that the O-ring was deformed from apparently extruding into the gap between the wall of the gun and the OD of the sub. It was also noted that the gun had leaked approximately 180 mls of fluid which equates to approximately 1.5" into the gun volume.

SUMMARY: The system held 5000 psi for 20 minutes with slight fluid seepage due to the deformation of the O-ring. Deformation is expected to be remedied by reducing the gap between the sub OD and the tube ID. In the present example, a larger than ordinary gap was used to allow for variations in the tubular's ID.

Example 3

PURPOSE: The purpose of this example is to test the pressure failure mode of the Slickwall gun system and to determine if the expandable O-ring could effect a 100% seal using a high pressure grease gun.

TEST SETUP: Gun Body was 16.66 inches long. This gave 12" open gun space between the sub faces. The subs were inserted into the gun and the O-rings were expanded using a high pressure hand grease gun. The gun system was then placed into the Navy gun and pressure applied. The pressure was increased slowly until failure occurred.

RESULTS: Failure occurred at 9700 psi. The pressure chamber was depressurized an the gun system examined. The failure mode was "gun body collapse". The GO plug in the top sub was removed and less than 10 MLS of water ran out of the system.

SUMMARY: The expandable O-ring did effect a 100% seal as evidenced by only 10 MLS of water drained from the system after collapse. It is noted that the failure pressure of 9700 psi is probably higher tant could be expected due to the short gun section. The subs probably gave added collapse strength to the system.

Example 4

PURPOSE: The purpose of this example is to determine the true collapse pressure for the 4" Slickwall gun body.

TEST SETUP: A 4 foot gun section was assembled with the standard expandable O-ring top and bottom sub faces. The assembled system was placed into the Navy gun chamber and pressurized to collapse.

RESULTS: The gun body collapsed at 7300 psi. It should be noted that the computer collapse calculations showed the system should have collapsed at 6100 psi.

SUMMARY: The design requirements for the system was 5000 psi. Since the collapse failure was 7300 psi, this indicates the system has approximately a 46% safety factor. It should also be noted that in example 3 a 1 foot gun section held 9700 psi thus demonstrating the expandable O-ring is capable of nearly 10 kpsi. Pressure wise, the 4" slickwall system has more than adequate pressure capability.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A sealing apparatus comprising
   (a) support member with a sealing surface, with a groove defined by the sealing surface, and with threads defined on the surface;
   (b) a sealing member positioned in the groove and defining a fluid reservoir in the groove between the support member and the sealing member;
   (c) a valve supported by the support member, with a passage defined through the support member, said passage placing the valve in fluid communication with the fluid reservoir.

2. The sealing apparatus of claim 1, further comprising:
   (d) a fluid residing in the fluid reservoir.

3. The sealing apparatus of claim 2 wherein the fluid is selected from the group consisting of hydraulic fluid, paraffinic and cycloparaffinic petroleum fractions, greases, oils, glycols, hydrocarbons, air, gases, and combinations thereof.

4. The sealing apparatus of claim 3 further comprising a pump in fluid communication with the fluid reservoir for providing pressure to the fluid reservoir.

5. The sealing apparatus of claim 4 wherein the pump is a grease gun.

6. The sealing apparatus of claim 1 further comprising:
   (d) a mating member defining an opening for receiving the support member, such that the sealing member abuts against a wall of the opening.

7. A sealing apparatus comprising:
(a) a support member with a sealing surface, with a groove and threads defined by the sealing surface;
(b) a sealing member positioned in the groove and defining a fluid reservoir in the groove between the support member and the sealing member;
(c) a valve supported by the support member, with a passage defined through the support member, said passage placing the valve in fluid communication with the fluid reservoir; and
(d) a mating member defining an opening with walls for receiving the support member, with threads defined by the walls, such that the sealing member abuts against a wall of the opening, with the threads of the support member engaged with the threads of the mating member.

8. The sealing apparatus of claim 7, further comprising:
(e) a fluid residing in the fluid reservoir.

9. The sealing apparatus of claim 8 wherein the fluid is selected from the group consisting of hydraulic fluid, paraffinic and cycloparaffinic petroleum fractions, greases, oils, glycols, hydrocarbons, air, gases, and combinations thereof.

10. The sealing apparatus of claim 9 further comprising a pump in fluid communication with the fluid reservoir for providing pressure to the fluid reservoir.

11. The sealing apparatus of claim 10 wherein the pump is a grease gun.

* * * * *